Oct. 3, 1950     H. O. HUSEBY     2,524,705
DOUGH ROLLING DEVICE
Filed Dec. 15, 1947
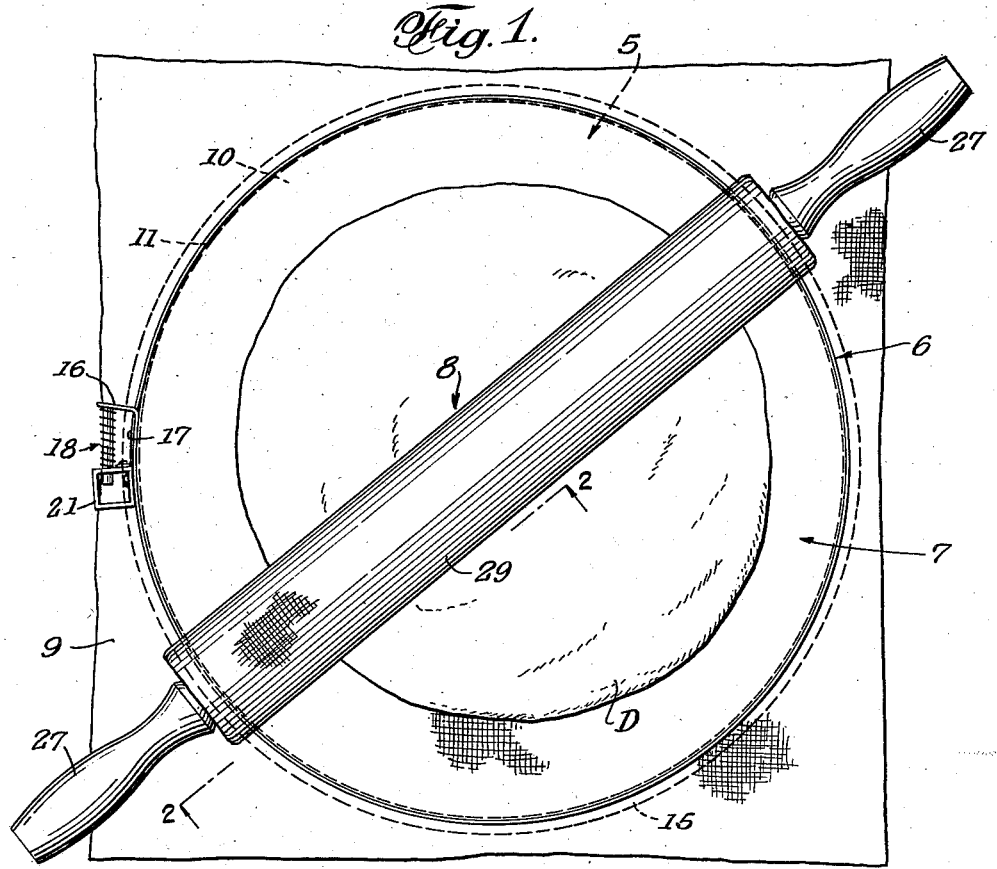
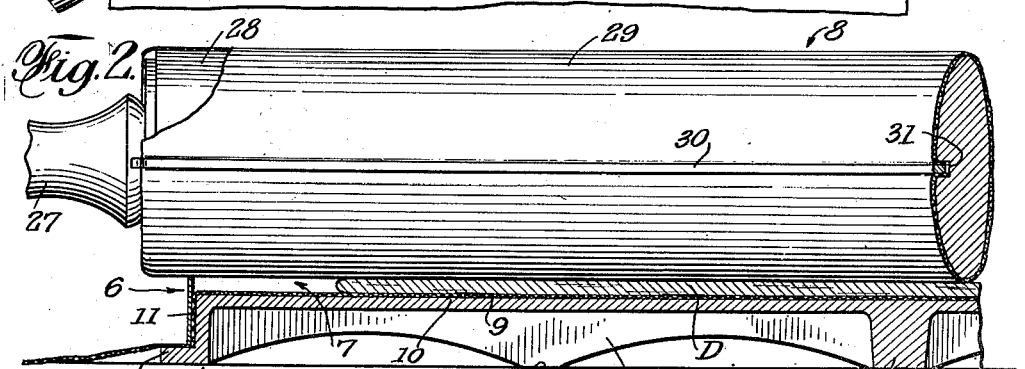
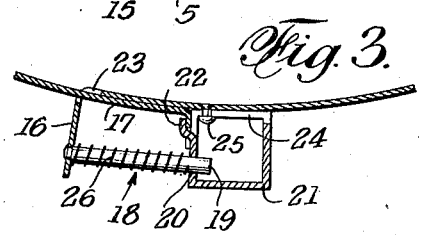
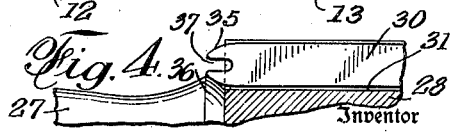
Inventor
HERMAN O. HUSEBY
C. G. Stratton
Attorney Patented Oct. 3, 1950

2,524,705

UNITED STATES PATENT OFFICE 2,524,705

DOUGH-ROLLING DEVICE

Herman O. Huseby, Los Angeles, Calif., assignor to Mildred G. Huseby, Altadena, Calif.

Application December 15, 1947, Serial No. 791,789

3 Claims. (Cl. 107—46)

This invention relates to means for rolling dough and deals more particularly with a device for rolling sheets of dough to specific size and thickness. The invention has special application for rolling pie crusts and like sheets of dough.

An object of the present invention is to provide a device of the type referred to that takes the "guess" out of pie crust forming and whereby sheets of dough of uniform size and thickness are obtained with great facility.

Another object of the invention is to provide a device, as indicated, whereby a sheet of dough, after rolling to size, shape and thickness, is readily handled for transfer from the device.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of a dough-rolling device according to this invention.

Fig. 2 is an enlarged cross-sectional view as taken on the line 2—2 of Fig. 1.

Fig. 3 is an enlarged fragmentary sectional view of means employed for contracting a gauge band employed in the invention.

Fig. 4 is a fragmentary longitudinal sectional view, showing a detail of the rolling pin.

The dough-rolling device that is illustrated comprises, generally, a base member 5, a gauge band 6 engaged with said member to define a dough-occupying area 7, a rolling pin 8 for rolling dough in said area, and, optionally, a piece of fabric 9 that is clamped on the base member by the band and comprising means facilitating removal of the rolled-out dough.

The base member 5 may be made of wood, plastic, metal, or any other suitable substantially inflexible material. The base shown is made of cast metal and is formed to have a flat upper surface 10 and a peripheral wall 11. The base is preferably circular as shown, but may have other shapes. To insure flatness of surface 10, said base may be formed with radial ribs 12 that extend between wall 11 and a central hub 13 and, in practice, the wall 11, hub 13 and preferably at least one portion 14 of each rib 12, are coplanar to provide a flat support surface for the base, the surface 10 being parallel thereto.

In the present form, the base member is provided with an outwardly directed flange 15 spaced from surface 10 and the same may be continuous, as shown, or interrupted for the sake of lightness.

The gauge band 6 is formed of a strip of flexible material such as steel or brass, and is of a width proportioned to the height of wall 11 whereby, with one edge of said band against flange 15, the other edge extends above surface 10 to form the area 7. The opposite ends 16 and 17 of the band strip are overlapped, as best seen in Fig. 3, and means 18 are provided for urging said ends apart to normally contract the band to have a size smaller than the diameter of wall 11.

As shown, band end 16 comprises an outwardly turned ear to which is affixed a pin 19 directed to extend through an opening 20 of a square piece of tubing 21 engaged by a hook 22 formed thereon, to the end 17 of the band strip. The latter band end is reduced in width and extends through an opening 23 of the other band end. The tubing 21, by means of a slot 24 therein and a headed pin 25 on the band, is mounted to slide on said band as limited by pin 25. A coil spring 26 on pin 19 comprises the means 18, said spring having its ends confined between ear 16 and tubing 21 and normally spreading apart said ear and tubing to cause normal contraction of the size of the band. It will be evident that by pressing ear 16 and tubing 21 toward each other, the band will enlarge and, in that condition, can be readily fitted to wall 11 of the base member. Upon release, spring 26 becomes effective to contract the band to firmly clamp around the base member.

The optional piece of fabric 9 is employed to cover surface 10 and is clamped in place by band 6. Said piece of fabric provides for cleanliness, but more particularly affords an effective means for handling a sheet of dough after the same is rolled.

The rolling pin 8 may be conventional. In practice, however, it is found that conventional rolling pins are both too short and too large in diameter for efficient operation. Accordingly, the present rolling pin is designed to be longer than the largest transverse dimension of the base member and its diameter is reduced to more efficiently knead or roll dough D in area 7. Such a pin could not be used in other connections, since the knuckles of the user when grasping the pin ends 27 would encounter the dough being rolled. The cylindrical portion 28 of the present pin is preferably provided with a fabric sleeve or blanket 29 that is removably held by a bar 30 in a slot 31 of the portion 28, the bar pinching the ends of said blanket against the walls of said slot. Cleanliness is, therefore, provided for and also improved traction of the rolling pin on the upper edge of band 6.

The rolling pin blanket 29 also provides for cleanliness and is readily replaced as above indicated. As shown in Fig. 4, each end of bar 30 is tapered as at 35 so that said ends seat against the undercut or flared part 36 of the pin ends 27. In this manner, said bar is readily centered with respect to the body 28 of the pin without attention on the part of the user. When said bar is to be removed to replace a blanket, the fingernail or some implement such as a knife, is inserted in either end slot 37 to effect lifting of said bar. The same is readily pressed into place to grip the ends of the blanket.

In practice, a sheet of fabric is placed over the base member and the band 6 applied to clamp the same in place. A piece of dough D is then placed on the fabric within the band and rolling out of said dough performed by rolling the pin 8 along the top edge of the band. The rolling proceeds until the dough fills area 7 and has been rolled out to the shape of surface 10. Should there be an excess of dough, said excess will overflow the band and be severed by the rolling pin during the normal movements thereof. Thus, each time that a piece of dough is rolled out, the same size, shape and thickness thereof is obtained.

After the dough has been rolled as above set forth, the band 6 is removed to thereby release fabric 9. The latter now becomes a convenient vehicle for removing the sheet of dough and applying the same wherever desired.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a device of the character described, a base member having a flat upper surface and a peripheral wall, and a dough-thickness-gauging band removably engaged with said wall and having portions extending above said flat surface to define a dough-occupying area the lateral extent of which coincides with the upper surface of the base member and the thickness of which is determined by the amount of extension of the band above said surface, said band having inter-engaged ends, and resilient means normally urging said ends in a direction to contract the band upon applying the same to the base member.

2. In a device of the character described, a base member having a flat upper surface and a peripheral wall, and a dough-thickness-gauging band removably engaged with said wall and having portions extending above said flat surface to define a dough-occupying area the lateral extent of which coincides with the upper surface of the base member and the thickness of which is determined by the amount of extension of the band above said surface, said band having overlapping inter-engaged ends, and resilient means normally urging said ends apart to thereby contract the band upon applying the same to the base member.

3. A device according to claim 1 a piece of fabric larger than and on the flat upper surface of the base member and affording marginal portions interposed and clamped between the peripheral wall of the base and the band.

HERMAN O. HUSEBY.

REFERENCES CITED

The following references are of record in the file of this patent:

UNITED STATES PATENTS

| Number | Name | Date |
| --- | --- | --- |
| 781,239 | Staassen | Jan. 31, 1905 |
| 1,353,077 | Smith | Sept. 14, 1920 |
| 1,702,144 | Weston | Feb. 12, 1929 |
| 1,982,155 | Earman | Nov. 27, 1934 |
| 2,070,199 | Dixon | Feb. 9, 1937 |
| 2,181,666 | Molin | Nov. 28, 1939 |
| 2,205,842 | Butman | June 25, 1940 |
| 2,355,307 | Kors | Aug. 8, 1944 |